United States Patent

Desbois et al.

[11] Patent Number: 5,908,907
[45] Date of Patent: Jun. 1, 1999

[54] AQUEOUS EMULSION OF (CO)POLYMER MADE FROM MONOMER CONTAINING ISOCYANATE GROUP AND OLEFINIC DOUBLE BOND

[75] Inventors: Michel Desbois, Rilleux-la-Pape; Roland Reeb, Gressy-en-France; Joël Richard, Chantilly; Francoise Truchet, Lyons, all of France

[73] Assignee: Rhone-Poulenc Chimie, Courbevoie Cedex, France

[21] Appl. No.: 08/454,293

[22] PCT Filed: Dec. 15, 1993

[86] PCT No.: PCT/FR93/01254

§ 371 Date: Aug. 1, 1995

§ 102(e) Date: Aug. 1, 1995

[87] PCT Pub. No.: WO94/13712

PCT Pub. Date: Jun. 23, 1994

[30] Foreign Application Priority Data

Dec. 15, 1992 [FR] France .................. 92 15117

[51] Int. Cl.$^6$ .................. C08F 226/02; C08F 226/06; C08F 214/02; C08F 214/18

[52] U.S. Cl. .................. 526/301; 526/291; 526/302; 526/261

[58] Field of Search .................. 526/301, 261, 526/291, 302

[56] References Cited

U.S. PATENT DOCUMENTS 4,485,226  11/1984  Noll et al. .................. 528/45

Primary Examiner—Jeffrey Smith
Assistant Examiner—Wu C. Cheng
Attorney, Agent, or Firm—Burns, Doane, Swecker & Mathis, L.L.P.

[57] ABSTRACT

An aqueous emulsion comprising at least one (co)polymer is provided. The (co)polymer is derived from a monomer having formula (1):

$$(R_1R_2C=CR_3—CO—L—)_q A(—NCOblock)_p \quad (1)$$

wherein $R_1$, $R_2$, and $R_3$, which are the same or different, represent a hydrogen or a group selected from hydrocarbon chains comprising 1 to 12 carbon atoms, halogens, and electron-withdrawing functional groups; L, which is the same or different, represents a divalent hydrocarbon radical comprising 2 to 12 carbon atoms; A represents an organic backbone which has n free valencies, n is a number between 2 and 7, and is equal to p+q; NCOblock represents a protected isocyanate functional group; p is a number between 1 and 6; and q is a number between 1 and 6.

12 Claims, 1 Drawing Sheet

AQUEOUS EMULSION OF (CO)POLYMER MADE FROM MONOMER CONTAINING ISOCYANATE GROUP AND OLEFINIC DOUBLE BOND

FIELD OF THE INVENTION

The present invention relates to a monomer containing at least one isocyanate functional group and an unsaturation, to a process of synthesis and to the (co)polymers which are produced thereby. It relates more particularly to compositions which can be used for coatings.

BACKGROUND OF THE INVENTION

In activity involving paints and varnishes, widespread use is made of diisocyanates, especially alkylene diisocyanates (Tolonate) and their derivatives of biuret type or their trimers.

However, two problems remain unsolved at present, namely:

the use of organic solvent, the presence of which is believed to be toxic and detrimental to the environment;

the need to market nonvolatile products, which has led to making the molecules heavier, this being done by oligomerizing the diisocyanates; this solution is not satisfactory because it employs an intricate, and hence expensive, functional group to solve the problem.

OBJECTS AND SUMMARY OF THE INVENTION

This is why one of the objectives of the present invention is to provide a process which makes it possible to obtain a (copolymer or rather a pre(co)polymer which, dispersed in waters may be stable.

Another objective of the present invention is to provide a monomer which allows these products (Tolonate) to be formulated in aqueous phase, with a view to responding to the evolution in techniques and to regulations, tending to make organic solvents disappear.

Another objective of the present invention is to provide a monomer the (co)polymers of which make it possible to obtain aqueous emulsions which have a mass concentration of approximately 40%.

Another objective of the present invention is to provide a monomer the (co)polymers of which make it possible to obtain aqueous emulsions which have good stability (chemical and colloidal) with time.

Another objective of the present invention is to provide a monomer the (co)polymers of which make it possible to obtain aqueous emulsions which give coating layers exhibiting good adhesion to supports (such as resisting standardized peeling on cross-scored coating).

Another objective of the present invention is to provide a monomer the (co)polymers of which make it possible to obtain aqueous emulsions which give coating layers exhibiting good impact strength (rapid deformation: ASTM and AFNOR tests), sufficient flexibility for bending (conical mandrel) and deep drawing (Erichsen deep-drawn test), and high surface hardness (Persoz).

Another objective of the present invention is to provide a monomer the (co)polymers of which make it possible to obtain aqueous emulsions which give coating layers exhibiting good optical properties (gloss).

Another objective of the present invention is to provide a monomer the (co)polymers of which make it possible to obtain aqueous emulsions which give coating layers exhibiting good resistance to solvents (ketons etc.).

These objectives and others which will appear later are met by means of a monomer which corresponds to the following formula:

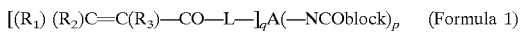

$$[(R_1)(R_2)C=C(R_3)-CO-L-]_q A(-NCOblock)_p \quad \text{(Formula 1)}$$

where the $R_1$, $R_2$ and $R_3$ which are similar or different, denote a hydrogen or a group chosen from:

hydrocarbon chains of 1 to 12 carbon atoms, especially alkyls, including aralkyls, aryls, alkoxys and silyls;

unreactive halogen atoms (fluorine, and even chlorine);

electron-withdrawing functional groups advantageously comprising the carbonyl group, such as alkoxycarbonyl hydroxycarbonyl (carboxylic acid) or aminocarbonyl (amide);

where the Ls, which are similar or different, denote a divalent (advantageously omega, omega prime) hydrocarbon radical of 2 to 12 carbon atoms, advantageously of formula:

$$-Y-L'-Y'-(NH-CO)_z- \quad \text{(Formula 2)}$$

where Y and Y', which are similar or different, denotes:

either a single bond;

or a group chosen from the following groups:

$-R_5)C(R_6)-$, $-NR_4-$, O or $-S-$; with $R_5$, $R_6$ and $R_4$ denoting a hydrogen or a group chosen from:

hydrocarbon radicals of 1 to 12 (advantageously of 1 to 4) carbon atoms, especially alkyls, aryls, aralkyls and silyls;

unreactive halogen atoms (fluorine, or even chlorine);

where L' denotes a hydrocarbon chain, especially alkylenes, arylenes, aralkylenes and silylenes [chain which may be interrupted by one or more, preferably light, chalcogen atoms, sulphur or advantageously oxygen, each chalcogen atom being preferably separated by at least two carbon atoms as in the glymes]; advantageously an alkylene radical (such as $-[CH_2]_m-$), preferably not very branched, preferably with free ω,ω' valencies where z is egual to 0 or, preferably, to 1;

where A denotes an organic backbone which has n free valencies, n being between 2 and 7 (closed intervals advantageously between 2 (not including this value) and 4, and n being equal to p+q;

where NCOblock denotes a protected isocyanate functional group;

where p is between 1 and 6, advantageously between 1 and 3, preferably between 1.5 and 2.5 (closed intervals);

where q is between 1 and 6 (closed interval), advantageously greater than 1 and not exceeding 3 (semiopen, semiclosed interval), preferably not exceeding 2 (semiopen, semiclosed interval).

The blocking agents most commonly employed are those mentioned by M. Wicks in his "blocked isocyanates" paper.

In general, and for obvious practical reasons, the values of p and of q are average, or statistical, values and, in this case, they can assume fractional values. Thus q is advantageously between 1 (not included) and 1.5, preferably 1.01 and 1.2, more preferably 1.1 plus or minus 0.05.

n is generally chosen from 3, 4 or 5, preferably 3.

As seen above, the hydrocarbon chains and radicals may be interrupted by one or more, preferably light, chalcogen atoms, sulphur or advantageously oxygen, each chalcogen atom being preferably separated by at least two carbon atoms as in the glymes (instead and in place of a chalcogen it is possible to employ groups of —$NR_4$— type with the possible disadvantage that amines can catalyse the release of some protective groups such as pyrazoles). They may also carry any functional group which is not reactive under the conditions of the synthesis and of the polymerization.

It should be mentioned that the total number of carbons in the said monomer is advantageously between 10 and 100, preferably between 20 and 100 more preferably between 25 and 75.

The backbone A may be made up from a heavy polyamine (including anilines), for example with a carbon number equal to at least 6, advantageously to 10, preferably to 15 [which is converted to isocyanate by the action of phosgene in a manner known per se].

The backbone A may be made up from a polyamine (including polyanilines) which will have been reacted with polyisocyanates (in most cases diisocyanates) in which a proportion of the isocyanate functional groups will have been blocked previously or will be blocked subsequently.

The backbone A may be made of from a polyol (including polyphenols and equivalent compounds such as thiols), which will have been reacted with polyisocyanates (in most cases diisocyanates) in which a proportion of the isocyanate functional groups will have been blocked previously or will be blocked subsequently.

The backbone A my be made up from a polyfunctional compound comprising functional groups containing mobile hydrogen, in general alcohol(s) and amine(s), a polyfunctional compound which will have been reacted with polyisocyanates (in most cases diisocyanate) in which a proportion of the isocyanate functional groups will have been blocked previously or will be blocked subsequently.

In the above cases: either the polyfunctional compound (which advantageous ly comprises more than two and not more than 4 functional groups, preferably three) will initially comprise at least one group [($R_1$) ($R_2$)C=C($R_3$)—CO—Y—L'Y'— or a compound of the type [($R_1$) ($R_2$)C=C($R_3$)—CO—Y—L'Y'—H will be reacted subsequently with the isocyanate functional groups.

It should be mentioned that the protective groups are released more easily if the nitrogen of the protected isocyanate functional group is bonded to an unsaturated, especially aromatic, carbon, which may sometimes be a disadvantage.

In the coating application it is preferable that the nitrogen of the protected isocyanate functional group should be bonded to a saturated carbon (sp3 hybridization).

The backbone A may also be that of the trimers and of the biuret [cf. FIG. 1 (trimer) and FIG. 2 (biuret) respectively; in the came of these figures m varies from 3 to 12 and the backbones which appear are trivalent]. In this case the values of n, p and q are average values. In this came Y and Y' are advantageously oxygen; L' is a radical (—$CH_2$—)$_\zeta$ with $\zeta$ between 2 and 10 and m+$\zeta$ advantageously between 4 and 12.

This backbone A may be advantageously chosen from Tolonates (m=6) (registered trademark), trimer and biuret.

The monomers according to the present invention may be produced easily from the corresponding isocyanates by applying the following sequence of stages which are known per se:

A) protection of a proportion (in the ratio p/n) of the isocyanate functional groups, B) reaction of the remainder of the isocyanates with a reactant referred to as "containing mobile H", of formula ($R_1$)($R_2$)C=C($R_3$)—CO—Y—L'—Y'—H or by reversing the two stages, mutatis mutandis:

A') reaction of a proportion (in the ratio q/n) of the isocyanate functional groups with a reactant referred to as "containing mobile H" of formula ($R_1$) ($R_2$)C=C($R_3$)—CO—L—H B') protection of the remainder of the isocyanate functional groups.

Or else, finally, by producing a premix, that is to say a mixture of the too reactants in the ratio p/q, which is reacted with the derivative containing a number of isocyanate functional groups.

The control of conforming to the said proportion is obtained merely by conforming to the stoichiometry.

[Progress in Organic Coatings (1975), vol. 3, p. 73]—their deblocking temperature is advantageously higher than 90° C.

It is preferable to carry out the synthesis of the monomer in the presence of a polymerization inhibitor, for example of quinone type, such as hydroquinone, this inhibitor, and especially hydroquinonee being advantageously present at a level of 100 to 10,000 ppm (mass) of the compound containing mobile hydrogen bearing an ethylenic unsaturation.

The monomers (by themselves or in the form of a mixture) according to the present invention have been found to be particularly easily polymerizable with acrylic or vinyl mono- or oligomers.

The protective groups are chosen from those which, under the conditions of the polymerization and while it takes place, release only not more than 10%, advantageously not more than 5%, preferably not more than 1%.

It is possible, in particular, to produce acrylovinyl latices which offer the possibility of formulations in aqueous phase, without organic solvent and with a rheology for the formulations obtained which permits easy processing.

These Tolonate 3 latices (especially of HDB and HDT type) impart, in particular, optical (absence of yellowing), mechanical (impact strength, surface hardness, flexibility for banding and deep drawing, and adhesiveness characteristics of a high level to top-grade paints and varnishes which are formulated.

The present invention is thus also aimed at (co)polymers. They are the result of the copolymerization of the monomers of formula 1 with (co)monomers chosen from the vinyl and acrylic ones.

The latex particles containing the said isocyanate functional groups are conventionally made up of polymers obtained by polymerization of ethylenically unsaturated monomers. They are a homopolymer or copolymer containing units derived from vinylaromatic, ethylenic, and alkenoic or ethylenic acid or ester monomers, optionally functionalized.

Polymers of this type can be easily obtained from (co) monomers accessible to any person skilled in the art and it will suffice to cite a few (co)monomers below, without any limitation of the invention being implied.

Those involved may be:

ethylenic monomers of isoprene, 1,3-butadiene, vinylidene chloride or acrylonitrile type, vinylaromatic monomers such as styrene, bromostyrans, alpha-methylstyrene, ethylstyrene, vinyltoluene, chlorostyrene or vinylnaphthalene, alkenoic acids, esters or anhydrides such as acrylic and methacrylic acids, alkyl acrylates and methacrylates in which the alkyl group has 3 to 10 carbon atoms, hydoxyalkyl acrylates and esters of ethylenic acids containing 4 or 5 carbon atoms.

Among the polymers of which the said particles may consist it is possible to mention homopolymers or copolymers containing units derived from vinyl, acrylic and vinylaromatic monomers, from vinyl esters, from alkyl esters of α- and β-unsaturated acids, from esters of unsaturated carboxylic acids, from vinyl chloride, from vinylidene chloride and/or from dienes.

The following (co)monomers may be mentioned more particularly by way of illustration (or, more precisely, of paradigm):

By way of vinyl and acrylic monomers which are suitable for the invention there may be mentioned more particularly those derived from styrene, acrylic acid, acrylic esters, methacrylic acid, monobenzyl maleate, 2-vinylpyridine, methyl styrenesulphonate, chloromethylstyrene, hydroxypropyl methacrylate, hydroxybutyl acrylate, hydroxyethyl acrylate, acrylonitrile and/or acrolein.

These monomers are employed by themselves or mixed with each other in any proportion, or else as a mixture with another copolymerizable monomer chosen from those mentioned above.

The polymer particles may be obtained by making use of any polymerization technique such as polymerization in conventional emulsion, in microemulsion or, if appropriate, by polymerization in an organic medium. These techniques, familiar to a person skilled in the art, will not be recalled here.

The particles constituting the latex carrying isocyanate functional group(s) according to the invention are hydrophobic and advantageously have a size ($d_{90}$) which is generally between 0.01 micrometer and 20 micrometers and preferably not exceeding 5 micrometers or even 3 micrometers. They are calibrated, monodisperse, and present in the latex in a proportion of a quantity varying between 0.2 and 65% by weight of the total weight of the latex.

According to the present invention, in order to obtain satisfactory results, it is desirable that the content of blocked isocyanate functional group(s) in the (co)polymer (latex or epilayer in the case of an epipolymerization) should be at least equal to $5\times10^{-2}$, advantageously to 0.1, preferably to 0.2 functional groups, more preferably 0.3 functional groups per kilogram (equivalents per kilogram). There is no upper limit, except for an economic one; it is desirable, all the same, that the mass percentage of the, or of the mixture of, monomer(s) according to the invention should not exceed 75% of the mass weight of latex.

There is no upper limit other than an economic one in the case where a tolonate trimer (FIG. 1 with m=6) is employed with approximately two isocyanate functional groups masked by a methyl ethyl ketoxime protection and a hydroxyethyl acrylate branch grafted onto the last isocyanate functional group.

A value of 0.1 functional group per kilogram corresponds approximately to an incorporation of 5 mass % of the monomer of formula I into the latex.

The present invention also relates to a process for the preparation of latices carrying isocyanate functional group (s) according to the following techniques:
the introduction, during the polymerization of the monomer(s) forming the latex particles, of a monomer according to the invention in suspension in a proportion of the, or of one of the, monomers, and
overpolymerization (in the sense of an epipolymerization), which consists of a synthesis of the type sometimes referred to as "core-shell": a latex seed is overpolymerized with the (co)monomer(s) in the presence of initiator and of a surfactant. The monomer according to the invention, in suspension in a proportion of (co)monomer(s), is introduced at the end of polymerization so as to obtain latex beads of a precise and narrow particle size distribution, in which the monomer according to the invention is grafted at a more or less great distance from the particle core.

In general the polymerization temperature is between 30 and 90° C., advantageously between 40 and 80° C. The duration is in general between 1 and 10, advantageously between 4 and 8 hours.

After polymerization the latex is treated by addition of a redox system and by distillation, optionally under vacuum, in order to remove all traces of residual monomers from it, and is then purified.

Advantageously, the polymer forming the latex contains from 1 to 50% by weight advantageously 3 to 25% by weight, of the monomer according to the invention.

Another subject of the present invention is compositions which can be used for paints comprising at least one (co)polymer according to the invention as emulsions in water.

According to an embodiment of the invention the composition additionally comprises a catalyst for deblocking the isocyanate functional groups (cf. Journal of Applied Polymer Science, "Catalysis of the Isocyanate—Hydroxyl Reaction", vol. IV, issue No. 11, p. 207 (1960), J. W. Britain).

These catalysts are knom per se and are advantageously chosen from those which induce a temperature of release of the isocyanate functional groups which does not exceed the usual temperature of the final setting operations of the varnish or of the paint or of equivalents.

The release temperature induced by the catalysts is advantageously approximately at least 100° C.

The paint composition may also include a coloured base consisting of a pigment and of titanium oxide.

The size of the emulsion particles is advantageously between 0.01 micrometer and 20 micrometers, preferably between 0.05 micrometers and 10 micrometers.

The mass concentration of copolymer in water is advantageously between 20% and 45%.

The aqueous phase advantageously contains soluble oligomers of polyol or polyol-(poly)amine or polyester-polyol condensate type in sufficient quantity to permit the final polycondensation.

These are the polyols usually employed during condensations with the common isocyanates.

The storage stability of the dispersions thus obtained is good. The following nonlimiting examples illustrate the invention.

DETAILED DESCRIPTION OF THE PREFERRED EMBODIMENTS

Example 1

Figure 1:
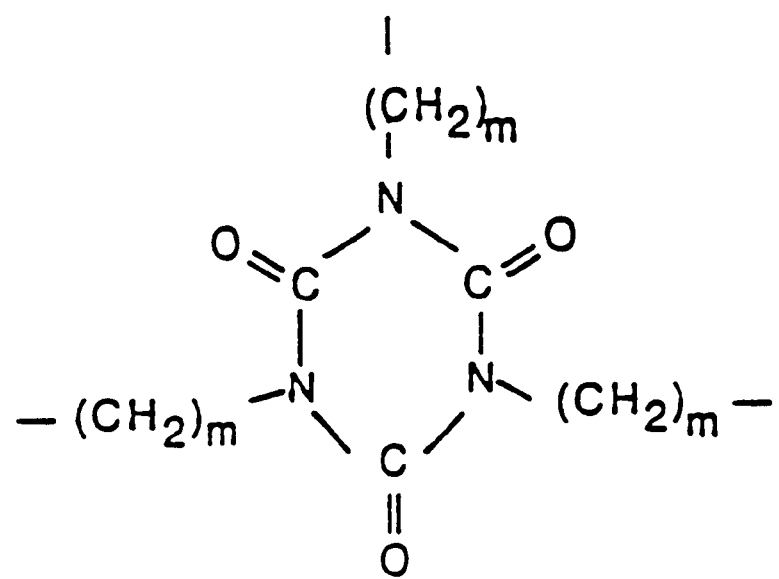
FIG. 1 shows a trimer as the backbone A.
Figure 2:
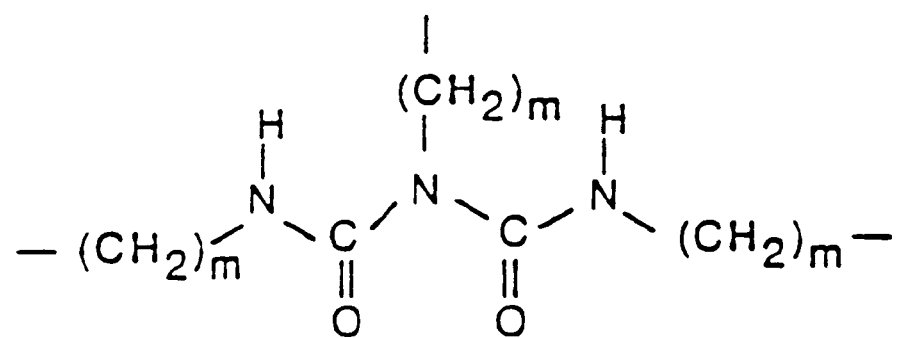
FIG. 2 shows a biuret as the backbone A.

Preparation of an acrylic monomer functionalized with a Tolonate HDT blocked with methyl ethyl ketoxime (referred to by the acronym MEKO hereinafter) and condensed with hydroxyethyl acrylate (HEA).

The following raw materials are used:

| | |
|---|---|
| Tolonate HDT (known as 0.52 NCO equivalent) | 100 g |
| MEKO 0.346 mol (M = 87) | 30.2 g |
| HEA 0.174 mol (M = 116) | 20.2 g |
| Butyl acrylate (solvent) | 100.2 g |

The equipment employed is the following:
Jacketed 250-ml reactor under a nitrogen atmosphere
Anchor stirrer (300 rev/min)
Condenser
Dropping funnel
The procedure defined below is followed:
The Tolonate HDT (hexamethylene diisocyanate trimer) is introduced into the reactor, the condenser being fitted on top. The medium is heated to 60–70° C. and the methyl ethyl ketoxime (MEKO) is introduced via the dropping funnel so that the temperature does not exceed 80–90° C.

After the end of the addition the temperature of the mixture is maintained for 1 hour approximately at 80±5° C.

At the end of this period the hydroxyethyl acrylate (HEA) is added dropwise and the temperatue of the mixture is maintained at 80–90° C.

At the and of addition the mixture is maintained at 80±5° C. for one hour.

At the and of reaction the NCO value of the mixture is 0.00 NCO groups/100 g.

The mixture is then cooled to 60–65° C. and poured onto the butyl acrylate.

A solution is thus obtained of acrylic monomer functionalized using the blocked Tolonate HDT in butyl acrylate, the solids content of which is 60%.

The latent NCO of the resulting solution is 0.207 NCO/100 g of solution, or 8.7%.

Example 2

In the following example a tolonate HDT blocked with methyl ethyl ketoxime (MEKO) and hydroxyethyl acrylate (HEA) is prepared.

The following raw materials are used:

| | |
|---|---|
| Tolonate HDT (NCO concentration = 0.52 equivalents) | 100 g |
| MEKO 0.346 mol (M = 87) | 30.2 g |
| HEA 0.174 mol (M = 116) | 20.2 g |
| Butyl acrylate (solvent) | 100.2 g |

The equipment employed is the following:
Jacketed 250-ml reactor under a nitrogen atmosphere.
Anchor stirrer (300 rev/min)
Condenser
Dropping funnel
The procedure defined below is followed:
The methyl ethyl ketoxime (MEKO) and the hydroxyethyl acrylate (HEA) are introduced into a beaker (premix). The tolonate HDT is introduced into the reactor, with the condenser fitted above. The mixture is heated to 60–70° C. and the premix is introduced via a dropping funnel so that the temperature does not exceed 80–90° C. At the end of addition the temperature of the mixture is maintained for one hour approximately at 80° C.±5° C.

At the end of reaction the NCO value of the mixture is 0.00 NCO groups/100 g. The mixture is then cooled to 60–65° C. and poured onto the butyl acrylate. A solution of blocked Tolonate HDT in butyl acrylate is thus obtained.

Example 3

Emulsion copolymerization, with acrylic and vinyl monomers, of the functional monomer (called AEHDB) obtained according to Example 1 by condensation, in butyl acrylate (BuA), of hydroxyethyl acrylate with the HDT trimer partially blocked with mathyl ethyl ketoxime.

The following are introduced into a 25-liter stainless steel autoclave equipped with a stirrer:
100 parts of deionized water,
48 parts of styrene,
48 parts of the AEHDB/BuA mixture prepared in Example 1, diluted beforehand with BuA in order to contain 20% by weight of AEHDB,
2.4 parts of acrylic acid,
0.7 parts of sodium lauryl sulphate,
0.9 parts of aeonium persulphate.

The reaction mixture is heated to 75° C. with stirring and this temperature is maintained during the reaction period, that is 9 hours. The degree of conversion is then 98%. The latex obtained contains a mass proportion of particles (solids content) of 49%. The particles have a diameter of 0.120 micrometers and a composition substantially equivalent to that of the materials used (comonomers, initiator, emulsifiers).

Example 4

Emulsion copolymerization of the functional monomer (called AEHDB) obtained according to Example 1 (condensation, in BuA (butyl acrylate), of hydroxyethyl acrylate (HEA) with the HDT trimer partially blocked with methyl ethyl ketoxime) in a seed consisting of an acrylovinyl copolymer latex.

1. Preparation of the Seed

The following are introduced into a 25-liter stainless steel autoclave equipped with a stirrer:
100 parts of deionized water,
32 parts of styrene,
1 part of divinylbenzene,
55 parts of BuA,
7 parts of ethylene glycol monomethacrylate,
2.6 parts of acrylic acid,
1.6 parts of sodium dodecyleulphonate,
0.8 parts of ammonium persulphate.

The reaction mixture is heated to 80° C. with stirring and this temperature is maintained during the reaction period, that is 10 hours. The degree of conversion is then 99%. The latex obtained contains a mass proportion of particles (solids content) of 49.5%. The particles have a diameter of approximately 0.070 micrometers and a composition substantially equivalent to that of the materials used (comonomers, initiator, emulsifiers). This latex will be employed as seed for polymerizing the AEHDB monomer.

2. Copolymerization of AEHBD in the Seed Prepared

The following are introduced into a 25-liter stainless steel autoclave equipped with a stirrer:
15 liters of the seed latex (mass solids content=49.5%),
400 g of the AEHDB/BuA mixture prepared in Example 1, which contains 60% by weight of AEHDB,
100 g of styrene, 5 grams of potassium hydroxide.

The temperature of the reaction mixture is raised to 75° C. and 10 grams of potassium persulphate dissolved in 1.5 l of deionized water are introduced into the autoclave. This temperature is maintained for 5 hours, then the temperature is raised to 85° C. and is maintained for 3 hours, followed by cooling to ambient temperature. A stable latex functionalized with blocked isocyanate groups is thus obtained, in which the mass solids content is 46.5% and whose size is 0.072 micrometers.

Example 5

Stable aqueous dispersion containing a latex functionalized with blocked isocyanate functional groups and a water-soluble polyol-polyaine condensate.

1 l of the functionalized latex prepared according to Example 3 is introduced into a receptacle equipped with a stirrer, to which is then added the product of reaction of 240 g of polycaprolactone glycol, of 48.75 g of propane suiphons and 13.05 g of hexamethylenediamine, with 10 g of sulphosuccinic acid as emulsifier. An aqueous dispersion is thus obtained which has a good stability over a period of more than 6 months.

After dehydration on a metal or plastic (PVC) support, and drying for 5 hours at 130° C., the dispersion forms a continuous and crosslinked film of polymer c.

Example 6

Microsuspension copolymerization of the functional monomer (called AEHDB) obtained in accordance with Example 1 (condensation, in BuA, of HEA with the HDT trimer partially blocked with methyl ethyl ketoxime).

An organic phase is prepared by mixing the following constituents in a first receptacle equipped with a stirrer:

55 parts of styrene, 3.5 parts of lauroyl peroxide, 41.5 parts of the AEHDB/BuA mixture prepared in Example 1, diluted beforehand with BuA in order to contain 30% by weight of AEHDB.

An aqueous phase is also prepared in a second receptacle equipped with a stirrer, by dissolving 60 g of sodium lauryl sulphate and 60 g of ethoxylated nonylphenol (30 ethylene oxide units per molecule) in 12 l of demineralized water.

5 kg of the phase prepared previously are then added and dispersed in the aqueous phase. The mixture obtained is homogenized at ambient temperature so as to obtain droplets of organic phase dispersed in water, 0.6 micrometers in size.

The mixture is introduced into a 25-liter stainless steel reactor equipped with a stirrer, where it is polymerized at 70° C. After 12 hours the reaction mixture is cooled and the residual monomer is removed by steaming.

4.9 kg of a stable latex functionalized with blocked isocyanate groups are thus obtained, in which the solids content is 28.8% and the mean particle diameter 0.8 micrometers.

Example 7

Objective

Synthesis of a blocked acrylurethane by condensation of hydroxyethyl acrylate (⅓) with ⅔ MEKO blocked HDT in solution in butyl acrylate (SC=60%).

Materials used

HDT (NCO=0.525)=100 g

MEKO (Servoxim Y250>99.5%) 0.35 mol×87=30.45 g

Hydroxyethyl acrylate (Atochem) 0.175 mol×116=20.3 g stabilized with: hydroquinone (photo grade) 0.1% relative to HEA, catalysed with DBTL (100%) 0.2% relative to HEA, Butyl acrylate (Atochem) for SC=60%=100.5 g

Apparatus 500-ml round bottom flask with stirring, condenser, "Vertex" controlled heating mantle dropping funnel, argon bubbling.

Procedure 100 g of HDT and 100.5 g of butyl acrylate are introduced into a 500-ml round bottom flask under argon and then 30.45 g of MEKO are run in at ambient θ over 4 min. There is an exotherm (0.55° C.) and the free NCO content is followed while allowing the temperature to fall back to the ambient (T=20 min, NCO=0.77; T=40 min, NCO=0.77). 20.3 g of hydroxyethyl acrylate are then added over ≈1 min, at θ=28° C; there is no marked exotherm, heating is applied to θ=50° C. and then the NCOs are followed while maintaining θ=50° C. at

| T = 15' | NCO = 0.013 |
| T = 30' | NCO = 0.009 |
| T = 1 h | NCO = 0.005 |
| T = 1 h 30 | NCO = 0.004 + 2% excess |
| | HEA = 0.4 g exotherm θ = 60° C. |
| T = 1 h 45 | NCO = 0.0025 |
| T = 2 h 00 | NCO = 0.0007 | stop overnight heat the reaction mixture to 50° C.+2% excess

HEA=0.4 g no mrked exotherm at T=2 h 30 NCO=0.000. In the product obtained q is greater than 1 (between 1.02 and 1.04). Viscosity of the final product: 139 cP

Example 8

Emulsion-copolymerization of a mixture of acrylic monomers containing 5% by weight of the functional monomer AEHDB, according to a process based on a preemulsion of the comonomers.

Preemulsion 4.5 kg of deionized water are mixed in a 25-1 vessel with 244 g of an aqueous solution of sodium dodecylbenzene-sulphonate (Na-DBS) at a concentration of 23% by weight. The mixture of the following acrylic comonomers is introduced into this solution with stirring:

5.29 kg of methyl methacrylate (MMA), 5.06 kg of butyl acrylate (BuA), 337 g of acrylic acid (AA), 938 g of an AEHDB/BuA mixture containing 60% by weight of functional monomer AEHDB.

The mixture obtained is emulsified with the aid of an Ultraturrax homogenizer (marketed by Prolabo) for 5 minutes at 20,000 revoluticns/minute. The preemulsion of the acrylic monomers containing the functional monomer AEHDB is thus obtained.

Polymerization 9.87 kg of deionized water are introduced into a 25-liter stainless steel reactor equipped with a stirrer and are taken to 80° C. with stirring.

The following are then added:

500 g of the preemulsion prepared above, 500 g of an aqueous solution containing 33.75 g of ammonium persulphate initiator.

There is a wait of 15 minutes for the initiation of the reaction to take place, and then the remainder of the preemulsion, that is 15.87 kg, is added over a period of 4 hours.

750 g of water are then added and curing is allowed to proceed at 81° C. for 1 hour.

Cooling to 60° C. is then applied and 11.25 g of tert-butyl hydroperoxide and 6.75 g of $Na_2S_2O_5$ are added. The temperature is maintained at 60° C. for 30 minutes and cooling to ambient temperature is then carried out. The material is neutralized with a solution of aqueous ammonia diluted to 20%. A latex is thus obtained which has the following characteristics:

40.5 mass % solids content, pH=7.5

Brookfield RTV-DV 11 viscosity (50 rev/min): 29 centipoises, particle size: 0.9 micrometers, grain content: 170 ppm.

Example 9

Emulsion copolymerization of a mixture of acrylic monomers containing 7% by weight of the functional monomer AEHDB, according to a process based on a preemulsion of the comonomers.

Preemusion 4.5 kg of deionized water are mixed in a 25-1 vessel with 244 g of an aqueous solution of sodium dodecylbenzenesulphonate (Na-DBS) at a concentration of 23% by weight. The mixture of the following acrylic comonomers is introduced into this solution with stirring:

4.84 kg of methyl methacrylate (MMA), 5.06 kg of butyl acrylate (BuA), 563 g of acrylic acid (AA), 1.31 kg of an AEHDB/BuA mixture containing 60% by weight of functional monomer AEHDB.

The mixture obtained is emulsified with the aid of an Ultraturrax homogenizer (marketed by Prolabo) for 5 minutes at 20,000 revolutions/minute. The preemulsion of the acrylic monomers containing the functional monomer AEHDB is thus obtained.

Polymerization 9.22 kg of deionized water are introduced into a 25-liter stainless steel reactor eguipped with a stirrer and are taken to 80° C. with stirring; the following are then added:

500 g of the preemulsion prepared above, 500 g of an aqueous solution containing 33.75 g of ammonium persulphate initiator.

There is a wait of 15 minutes for the initiation of the reaction to take place and then the remainder of the preemulsion, that is 16.02 kg, is added over a period of 4 hours.

750 g of water are then added and the curing is allowed to proceed at 81° C. for 1 hour. Cooling to 60° C. is then applied and 11.25 g of tert-butyl hydroperoxide and 6.75 g of $Na_2S_2O_5$ are added. The temperature is maintained at 60° C. for 30 minutes and cooling to ambient temperature is then carried out. The material is neutralized with a dilute 10% sodium hydroxide solution. A latex is thus obtained which has the following characteristics:

mass solids content: 39.4%, pH=7.5,

Brookfield RTV-DV 11 viscosity (50 rev/min): 52 centipoises, particle sizes: 1.5 micrometers, grain content: 26 ppm.

Example 10

Emulsion copolymerization of a mixture of acrylic monomers and of styrene containing 7% by weight of the functional monomer AEHDB, according to a process based on a preemulsion of the comonomers.

Preemulsion 4.5 kg of deionized water are mixed in a 25-1 vessel with 245 g of an aqueous solution of sodium dodecylbenzenesulphonate (Na-DBS) at a concentration of 23% by weight. The mixture of the following acrylic comonomers is introduced into this solution with stirring:

5.10 kg of styrene (S), 4.80 kg of butyl acrylate (BuA), 565 g of acrylic acid (AA), 1.30 kg of the AEHDB/BuA mixture containing 60% by weight of functional monomer AEHDB.

The mixture obtained is emulsified with the aid of an Ultraturrax homogenizer (marketed by Prolabo) for 5 minutes at 20,000 revolutions/minute. The preemulsion of a mixture of acrylic monomers and of styrene, containing the functional monomer AEHDB, is thus obtained.

Polymerization 9.22 kg of deionized water are introduced into a 25-liter stainless steel reactor equipped with a stirrer and are taken to 80° C. with stirring.

The following are then added:

500 g of the preemulsion prepared above, 500 g of an aqueous solution containing 33.75 g of ammonium persulphate initiator.

There is a wait of 15 minutes for the initiation of the reaction to take place and the remainder of the preemulsion, that is 16.01 kg, is then added over a period of 4 hours.

750 g of water are then added and curing is allowed to proceed at 81° C. for 1 hour.

Cooling to 60° C. is then applied and 11.25 g of tert-butyl hydroperoxide and 6.75 g of $Na_2S_2O_5$ are added. The temperature is maintained at 60° C. for 30 minutes and cooling to ambient temperature is then carried out. The material is neutralized with a dilute 10% sodium hydroxide solution. A latex is thus obtained which has the following characteristics:

mass solids contents 39.6%, pH=7.5,

Brookfield RTV-DV 11 viscosity (50 rev/min): 58 centipoises, particle sizes 1.2 micrometers, grain contents 220 ppm.

Example 11

Emulsion copolymerization of a mixture of acrylic monomers containing 10% by weight of the functional monomer AEHDB, according to a process based on a preemulsion of the comonomers.

Preemulsion 4.5 kg of deionized water are mixed in a 25-1 vessel with 244 g of an aqueous solution of sodium dodecylbenzenesulphonate (Na-DBS) at a concentration of 23% by weight. The mixture of the following acrylic comonomers is introduced into this solution with stirring:

4.5 kg of methyl methacrylate (MMA), 5.06 kg of butyl acrylate (BuA), 563 g of acrylic acid (AA), 1.88 kg of the AEHDB/BuA mixture containing 60% by weight of functional monomer AEHDB.

The mixture obtained is emulsified with the aid of an Ultraturrax homogenizer (marketed by Prolabo) for 5 minutes at 20,000 revolutions/minute. The preemulsion of the acrylic monomers containing the functional monomer AEHDB is thus obtained.

Polymerization 9.22 kg of deionized water are introduced into a 25-liter stainless steel reactor equipped with a stirrer and are taken to 80° C. with stirring.

The following are then added:

500 g of the preemulsion prepared above, 500 g of an aqueous solution containing 33.75 g of ammonium persulphate initiator.

There is a wait of 15 minutes for the initiation of the reaction to take place and the remainder of the preemulsion, that is 16.25 kg, is then added over a period of 4 hours.

750 g of water are then added and curing is allowed to proceed at 81° C. for 1 hour.

Cooling to 60° C. is then applied and 11.25 g of tert-butyl hydroperoxide and 6.75 g of $Na_2S_2O_5$ are added. The temperature is maintained at 60° C. for 30 minutes and cooling to ambient temperature is than carried out. The material is neutralized with a dilute 10% sodium hydroxide solution. A latex is thus obtained which has the following characteristics:

mass solids content: 40.5%, pH=7.5,

Brookfield RTV-DV 11 viscosity (50 rev/min): 78 centipoises, particle size: 0.84 micrometers, grain content: 315 ppm.

Example 12

Manufacture of the ⅓ HEA ⅔ MEKO Blocked Product tolonate HDT=500 g (NCO value=22.05%)

MEKO (methyl ethyl ketoxime)=152.3 g (1.75 mol)

HEA (hydroxyethyl acrylate)=101.5 g (0.875 mol)

Introduce the tolonate HDT (500 g) into a 1-1 reactor and then run in the MEKO (152.3 g) at ambient temperature over 10 minutes.

The exothermic reaction raises the temperature from 20 to 50° C.

After holding for 30' at this temperature, the HEA is run in over 5 minutes, the exotherm raises the temperature to 70° C.

After holding at 70° C. for 1 h the reaction mass is cooled to 20° C.

Example 13

Formulation of the 4 products obtained

| PROPERTIES | CONTROLS | GRAFTED LATEX 5% Tolonate (Example 8) | GRAFTED LATEX 7% Tolonate (Example 9) | GRAFTED LATEX 10% Tolonate (Example 11) |
|---|---|---|---|---|
| Reference No. | A | B | C | D |
| Composition (%) | 52MMA/ 45BA/ 3AA | 47MMA/45BA/ 3AA + 5% BAU | 43MMA/45BA/ 5AA + 7% BAU | 40MMA/45BA/ 5AA + 10% BAU |
| s.c. (%) before neut. | 39.6 | 40.7 | 40.9 | 40.9 |
| with $NH_4OH$ | 39.3 | 40.5 | 40.7 | 40.6 |
| with NaOH | 38.9 | 40.0 | 39.4 | 40.6 |
| with $Na_2CO_3$ | 38.7 | 39.8 | 39.0 | 40.5 |
| Viscosity (cP) | 25 | 29 | — | 21 |
| with $NH_4OH$ | 25 | 29 | 540 | 680 |
| with NaOH | 23 | 25 | 52 | 708 |
| with $Na_2CO_3$ | 24 | 25 | 42 | 72 |
| pH (before neutr.) | 2.4 | 2.85 | 3.10 | 3.25 |
| with $NH_4OH$ | 8.1 | 8.50 | 8.00 | 8.20 |
| with NaOH | 7.5 | 7.50 | 7.50 | 9.00 |
| with $Na_2CO_3$ | 7.5 | 7.50 | 7.50 | 7.50 |
| Particle size (nm) | 730 | 910 | >1500 | 840 |

MMA = methyl methacrylate
BA = butyl acrylate
BAU = blocked acrylurethane
AA = acrylic acid Each of these 4 products is neutralized with one of the following 3 solutions: $NH_4OH$, NaOH, $Na_2CO_3$.

Example 14

Test in Varnish Formulation

A varnish formulation (Tolonate graft latex+polyol resin) has enabled products with better performance to be revealed.

Characteristics of the Formulation Mixture

Latex grafted Tolonate (A, B, C or D)

Synaqua 3510 WL (Cray Valley)

Polyester polyol at a concentration of 50% in water/Proglyde DMM

Blocked NCO/OH ratio=1

Film 100μ moist (~50μ dry)

Drying in air 18 h then curing 30' to 1 h at 160° C.

The mixture is applied as a film onto glass plates (100 μm moist) and then characterized using the Persoz hardness (expressed in seconds) and the resistance to methyl ethyl ketone (MEK).

| Scale of the resistance to methyl ethyl ketone (value from 0 to 4) | 0: 1 2 3 4 | No film degradation Slight attack The film is cloudy The film is crumpled The film is dissolved |
|---|---|---|

The 4 products obtained as A (control), B, C or D are formulated with the polyol (as well as A alone) and then applied as a film and measured.

The NaOH-treated products C ad D enable acceptable hardness and solvent resietance properties to be obtained.

BLOCKED TOLONATE GRAFTED LATICES AFTER NH₄OH NEUTRALIZATION

| | | Before cure | | After 160° C./30' | | After 160° C./1 h | |
|---|---|---|---|---|---|---|---|
| Ref. | Charact. | Hardness | MEK test | Hardness | MEK test | Hardness | MEK test |
| A | Latex alone | 290 | 4 | 288 | 2 | 299 | 2 |
| A | Latex + Polyol | 170 | 4 | 212 | 4 | 237 | 4 |
| B | Ltx + 5% Tol + Polyol | 183 | 4 | 218 | 1 | 211 | 1 |
| C | Ltx + 7% Tol + Polyol | 235 | 4 | 270 | 1 | 276 | 1 |
| D | Ltx + 10% Tol + Polyol | 119 | 1 | 175 | 1 | 210 | 0 |

Example 15

Test in Paint Formulation

Products C and D are applied onto a steel panel after the following formulation:

7% or 10% Tolonate grafted latex

Synaqua 3510 WL polyol (Cray Valley)

TiO₂ (Thann at Mulhouse) with [NCO]/[OH]=1 and [Pigment (TiO₂)]/[Binder]=0.7 paint film thicknese=approximately 50μ

| PRODUCT | A Alone | A + Polyol | C | D |
|---|---|---|---|---|
| Thickness (dry) | 41 μ | 38 μ | 46 μ | 57 μ |
| Cure | 1 h 160° C. | 1 h 160° C. | 1 h at 160 ° C. | 1 h/160° C. |
| Appearance | Crackled | Smooth | Uniform | Uniform |
| Hardness(es) (Persoz) | 143 | 165 | 122 | 93 |
| Bending | | | | |
| Deep-drawn | OK | OK | OK | OK |
| Enichem Reverse impact | 7.9 | 8.7 | 7.9 | 8.7 |
| AFNOR | 100 | 100 | 100 | 100 |
| ASTM | 80 | 80 | 80 | 80 |
| Adhesiveness | OK | OK | OK | OK |
| Gloss (%) | 48 | 39 | 13 | 12 |
| RUB-TEST | | | | |
| Chemical attack (MEK) | Fuel oil destroyed | Fuel oil destroyed | RAS | RAS |

→ Products C and D exhibit a satisfactory chemical resistance.

We claim:

1. A copolymer comprising a monomer having formula (1):

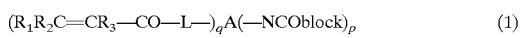

$$(R_1R_2C=CR_3—CO—L—)_q A(—NCOblock)_p \qquad (1)$$

wherein $R_1$, $R_2$, and $R_3$, which are the same or different, represent a hydrogen or a group selected from the group consisting of:
   hydrocarbon chains comprising 1 to 12 carbon atoms;
   halogens; and
   electron-withdrawing functional groups;

L, which is the same or different, represents a divalent hydrocarbon radical comprising 2 to 12 carbon atoms;

A represents an organic backbone which has n free valencies, n is a number between 2 and 7, and is equal to p+q;

NCOblock represents a protected isocyanate functional group;

p is a number between 1 and 6; and q is a number between 1 and 6, wherein said copolymer comprises greater than $5\times10^{-2}$ equivalents of blocked isocyanate functional groups per kilogram of copolymer.

2. The copolymer according to claim 1, wherein said hydrocarbon chains comprising 1 to 12 carbon atoms are selected from the group consisting of alkyls, aralkyls, aryls, alkyoxys, and silyls.

3. The copolymer according to claim 1, wherein said halogen is fluorine or chlorine.

4. The copolymer according to claim 1, wherein said electron-withdrawing functional groups are selected from the group consisting of carbonyls, alkoxycarbonyls, hydroxycarbonyls, and aminocarbonyls.

5. The copolymer according to claim 1, wherein L is a radical represented by formula (2):

$$—YLʹYʹ(NH—CO)_z— \qquad (2)$$

wherein
> Y and Y', which are the same or different, represent a single bond, $-R_5CR_6-$, $-NR_4-$, $-O-$, or $-S-$, wherein $R_5$, $R_6$, and $R_4$ each represents a hydrogen or a group selected from:
> > hydrocarbon radicals comprising 1 to 12 carbon atoms; and
> > halogens;
>
> L' represents a hydrocarbon chain which is uninterrupted or interrupted by one or more chalcogen, sulfur or oxygen atoms; and
>
> z is 0 or 1.

6. The copolymer according to claim 5, wherein L' is an alkylene, arylene, aralkylene or silylene radical.

7. The copolymer according to claim 1, wherein n is between 2 and 4, p is between 1 and 3, and q is between 1 and 3.

8. The copolymer according to claim 1, wherein A is an alcohol, an amine, a polyamine, a polyol, or a radical of formulas (3) or (4):

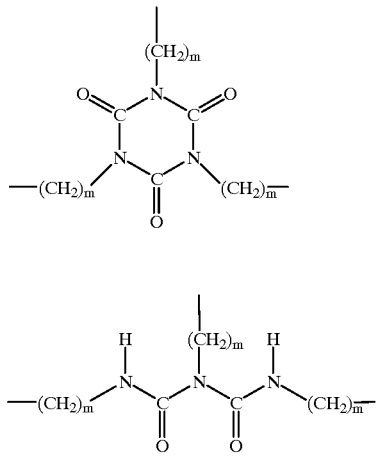

wherein m is an integer from 3 to 12.

9. The copolymer according to claim 1, wherein said monomer comprises between 10 and 100 carbon atoms.

10. The copolymer according to claim 1, further comprising a vinyl or acrylic comonomer.

11. The copolymer according to claim 10, wherein said comonomer is selected from the group consisting of:

styrene and its derivatives;

(meth)acrylic acid esters, hydroxy esters and amides;

vinyl esters;

vinyl and vinylidene chlorides;

vinylpyridines;

diethylaminoalkyl (meth)acrylates;

diethylaminoalkyl (meth)acrylamides;

allylamine;

ethylenimine;

(meth)acrylonitrile;

N-vinylimidazole;

dialkylaminomethylstyrenes;

vinylpyrrolidone;

divinylbenzene and its derivatives;

conjugated dienes;

polyallyl derivatives;

polyol (meth)acrylates;

methylenebis(acrylamide); and bis(acrylamido)acetic acid.

12. The copolymer according to claim 1, further comprising a vinylaromatic, ethylenic, and alkenoic or ethylenic acid or ester comonomer.

* * * * *